United States Patent [19]

Tohyama et al.

[11] 4,243,311
[45] Jan. 6, 1981

[54] IMAGE FORMING APPARATUS

[75] Inventors: Yoshikuni Tohyama, Yokohama; Yoshimasa Kimura, Kawasaki; Masato Ishida, Yokohama; Koichi Miyamoto, Tokyo, all of Japan

[73] Assignee: Canon Kabushiki Kaisha, Tokyo, Japan

[21] Appl. No.: 937,871

[22] Filed: Aug. 29, 1978

[30] Foreign Application Priority Data

Sep. 9, 1977 [JP] Japan .................. 52-108574

[51] Int. Cl.³ .................................. G03G 15/28
[52] U.S. Cl. ..................... 355/8; 355/14 R
[58] Field of Search .......... 355/8, 14, 3 R, 65, 355/66

[56] References Cited

U.S. PATENT DOCUMENTS

| 3,697,165 | 10/1972 | Morriston et al. | 355/8 |
| 3,815,991 | 6/1974 | Janssen et al. | 355/8 X |
| 3,907,422 | 9/1975 | Eppe et al. | 355/8 |
| 3,910,699 | 10/1975 | Middleton | 355/8 X |
| 4,084,898 | 4/1978 | Kurita | 355/8 |
| 4,124,288 | 11/1978 | Zeuthen | 355/8 |

Primary Examiner—R. L. Moses
Attorney, Agent, or Firm—Fitzpatrick, Cella, Harper & Scinto

[57] ABSTRACT

A scanning apparatus includes a scanner, a driver for reciprocating the scanner, and a control mechanism which controls the drive force of said driver so as to drive the scanner with a low acceleration at the initial stage of drive of the scanner.

19 Claims, 9 Drawing Figures (a) SG1

(b) SG2

(c) VCℓ   $V_i$  $V_c$ (d) VCℓ   $V_i$  $V_c$

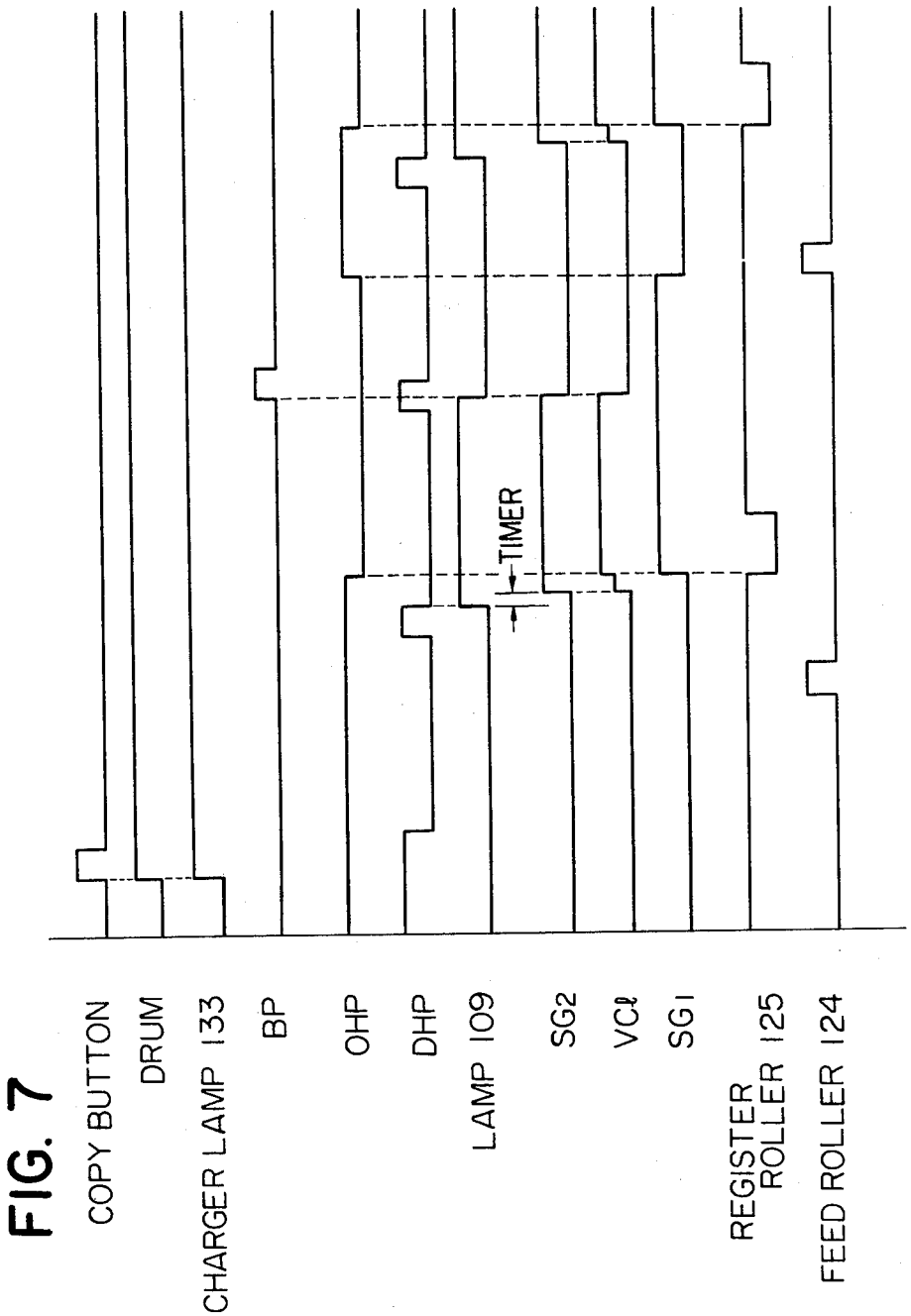

IMAGE FORMING APPARATUS

BACKGROUND OF THE INVENTION

1. Field of the Invention

The present invention relates to an image forming apparatus adapted for use for example in a copier, and more particularly to an image forming apparatus utilizing the slit scanning exposure method.

2. Description of the Prior Art

For the scanning of an original in a copier utilizing the slit exposure method, there is usually employed, as a scanning exposure means, a movable optical system in which an illuminating system and mirrors are reciprocated with respect to a stationary original placed on a fixed original carriage, or a movable original carriage which is reciprocated holding an original thereon while said mirrors are maintained stationary.

Such scanning exposure means is driven by a motor exclusively provided for this purpose, or by an electromagnetic clutch which selectively transmits the rotation of a main motor maintained in continuous rotation. In either case, and particularly in the case of drive with an electromagnetic clutch, there results a drawback in that the scanning means generates a vibration in the advancing direction thereof by the rapid clutching operation as said scanning means inevitably contains certain vibrational system. This tendency becomes more acute when the scanning speed of said scanning means is larger. This difficulty has conventionally been prevented by starting the scanning exposure of the original after said vibration is sufficiently attenuated, namely by extending the distance of the pre-exposure run of the scanning means, or, if this is not possible, by selecting the scanning speed of said scanning means below a certain limit.

SUMMARY OF THE INVENTION

An object of the present invention is to provide an image forming apparatus which does not result in image distortion at the start of scanning even at a high exposure scanning speed.

Another object of the present invention is to provide an image forming apparatus for minimizing the pre-exposure run distance of the scanning means.

A still further object of the present invention is to provide an image forming apparatus for minimizing the vibration of the scanning means at the start of movement thereof.

A still further object of the present invention is to provide an image forming apparatus for minimizing the vibration and noise of the apparatus.

A still further object of the present invention is to provide a copier capable of high-speed copying with a compact structure.

BRIEF DESCRIPTION OF THE DRAWINGS

FIG. 7 is a time chart explaining the functions of the apparatus shown in FIG. 1;

DESCRIPTION OF THE PREFERRED EMBODIMENTS

Figure 1:
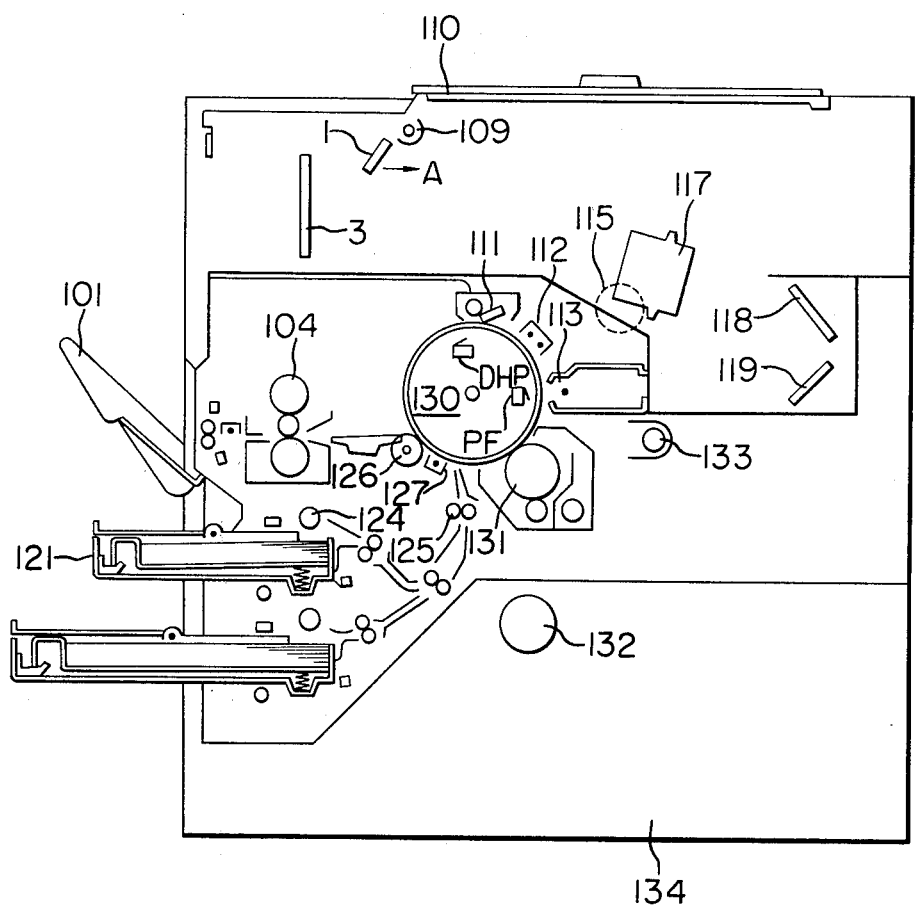
FIG. 1 is a schematic cross-sectional view of a copying apparatus in which the present invention is applicable.

In FIG. 1 indicating a copier provided with a scanning apparatus of the present invention in a cross-sectional view, there are shown an original table 110, an illuminating lamp 109, mirrors 1, 3, 118 and 119, a lens system 117, a cleaner 111, a primary charger 112, a charge eliminator 113 simultaneous with an exposure, a flush exposure lamp 133, a developing station 131, a photosensitive drum 8, a cassette 121, a paper feed roller 124, a transfer roller 126, a fixing roller 104, and a tray 101. An original placed on the original table 110 is subjected to slit exposure by the displacement of the lamp 109 and mirrors 1, 3 in the direction A, and the image of said original is focused through the lens system 117 and mirrors 118, 119 onto the drum 8. The drum surface, previously charged by primary charger, is subjected to charge elimination by the charge eliminator 113 simultaneously with the image exposure to form an electrostatic latent image thereon. The latent image thus formed is rendered visible at the developing station 131, and the thus obtained visible image is transferred by the transfer roller 126 onto a transfer sheet supplied by the paper feed roller 124 from the cassette 121 and fixed by the fixing roller 104. Thereafter the transfer sheet is ejected onto the tray 101.

Figure 2:
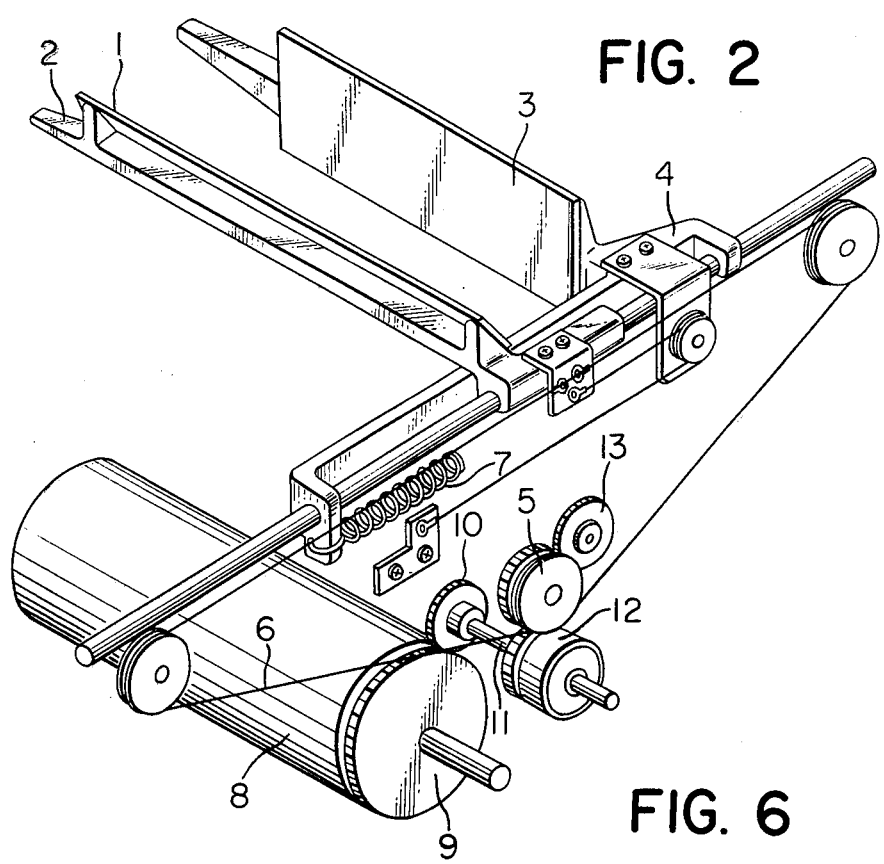
FIG. 2 is a perspective view of an exposure scanning apparatus according to the present invention.

FIG. 2 is a perspective view of the scanning apparatus utilizing a movable optical system shown in FIG. 1, wherein the scanning means is represented by a movable optical system composed of a first movable member 2 provided with an illuminating system for illuminating the original and a first mirror 1, and a second movable member 4 provided with a second mirror 3 moved in the same direction as but at a half speed of the displacement of said first movable member. The forward displacement of said movable optical system is achieved by a drive wire 6 which is fixed at an end thereof to said first movable member 2 and wound around a drive pulley. Also the reverse displacement is achieved by the recovering force of a spring 7 of which an end is fixed to said second movable member.

A drive shaft 11, which is driven by a gear 10 meshing with a drum gear 9 for driving the photosensitive drum, drives the drive pulley 5 through an electromagnetic clutch 12 provided on said shaft.

The photosensitive drum 8 is set into rotation by actuating a copy start button.

If, in this state, an entire supply voltage is applied to the electromagnetic clutch 12 to drive the drive pulley 5 as in the conventional mechanisms, the above-mentioned movable optical system is subjected to a very large acceleration as it is instantaneously accelerated from a stationary state to a normal scanning speed. As the drive transmission of the movable optical system is usually achieved by a wire of stainless steel etc. which is not completely rigid but is provided with certain elasticity, the drive system from said drive pulley through said wire to said first and second movable members can be considered to constitute an elastic system.

Thus said elastic system generates a vibration when it is subjected to a rapid accelerating energy through the clutch.

Figure 3:
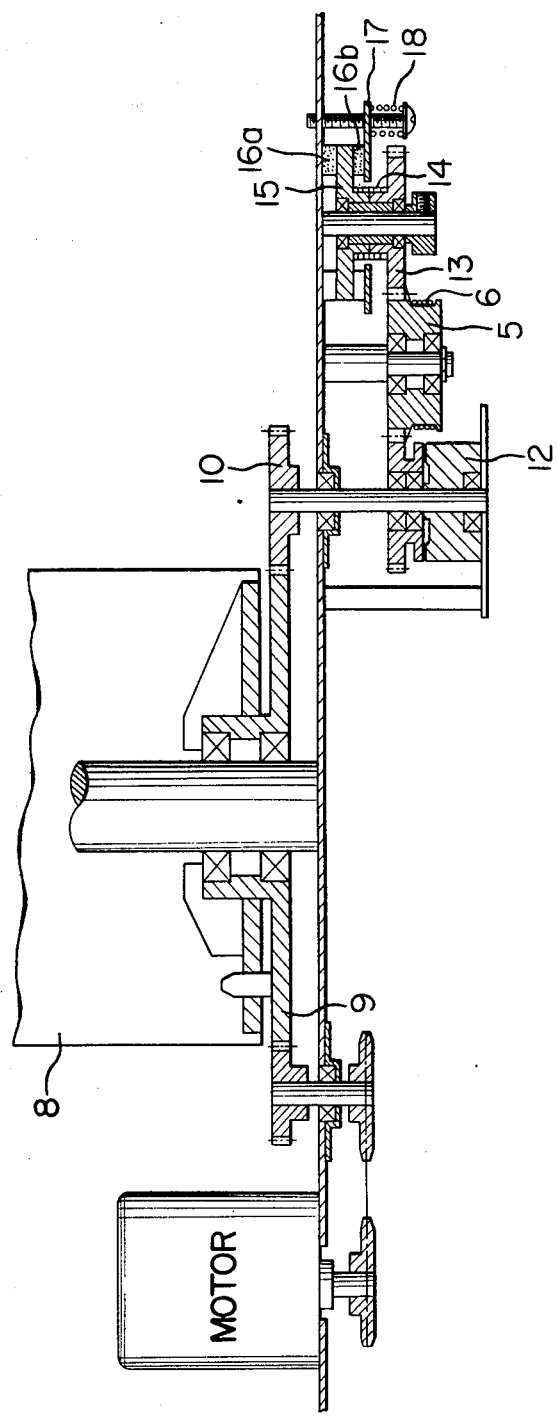
FIG. 3 is a cross-sectional view of the apparatus shown in FIG. 2.

FIG. 3 shows an embodiment, in a vertical cross-sectional view, for minimizing the above-mentioned vibration, by providing braking members between the clutch and the drive pulley for dissipating the force from the clutch for purposes other than driving the optical system.

In this embodiment the drive pulley is also meshing with a brake gear 13 which is connected, through a one-way clutch (spring clutch) 14, to a brake drum 15, against which two brake shoes 16a, 16b are pressed in a well-balanced state by means of a pressure plate 17 and three springs 18.

When the electromagnetic clutch 12 is energized to drive the first and second movable members by the drive pulley 5 for starting the exposure scanning, the brake gear 13 is simultaneously driven to set the one-way clutch 14 in engaged state, whereby the brake drum 15 is rotated to apply a braking force to the drive pulley 5. Consequently the drive force supplied by the clutch 12 is partly consumed by the friction between the brake drum 15 and two brake shoes 16a, 16b and the load torque of said friction brake causes certain slippage on the friction surface of said electromagnetic clutch 12 when it becomes connected, thereby realizing a state of slip connection. Due to the presence of said slip connection state, the drive force of the drive pulley at the initial state of scanning system driving becomes smaller than the drive force in the normal drive state.

Consequently the elastic system consisting of said first and second movable members and said wire is subjected to a smaller acceleration at the initial state of drive, whereby the vibration of such elastic system is very small and can be dissipated even within a short pre-exposure run distance. The above-mentioned driving method is also advantageous in that the optical scanning means is not affected by a small external perturbation present for example in the drive source.

During the reverse displacement of the movable optical system, the above-mentioned one-way clutch 14 is disconnected to prevent rotation of the brake drum 15, thereby avoiding unnecessary abrasion of the brake shoes. It is also possible to construct the mechanism in such a manner that the shoes 16a and 16b are brought into contact only during the initial drive state of the movable optical system thereby obtaining the braking force only during said initial state.

Furthermore the brake shoes 16a, 16b may also be brought into contact with the drive pulley itself or into a portion between the electromagnetic clutch and the drive pulley. Furthermore a braking effect is also obtainable by utilizing a generator.

Figure 4:
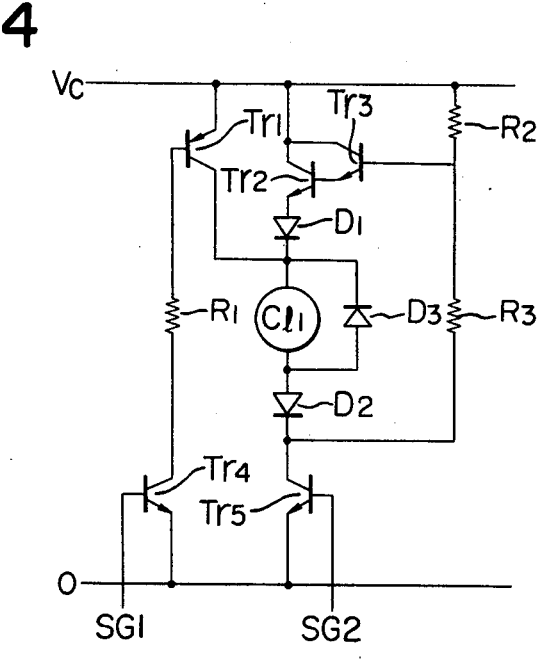
FIG. 4 is a diagram of an example of a control circuit for use in the exposure scanning apparatus of the present invention.
Figure 5:
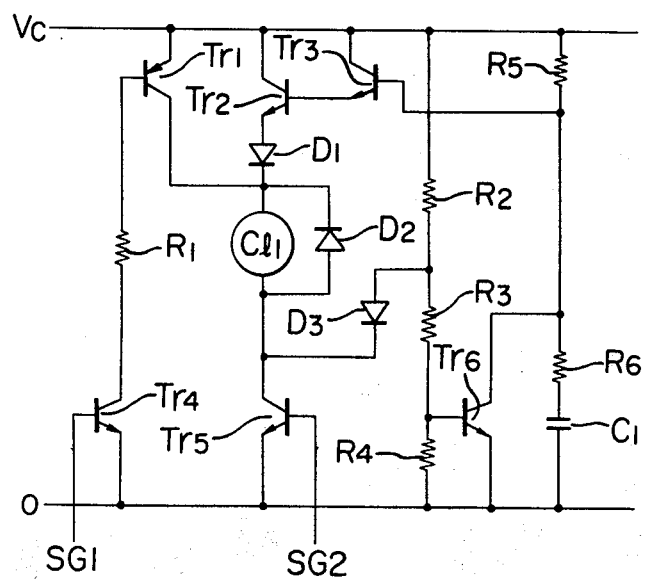
FIG. 5 is a diagram of an another example of said control circuit.

Next, FIGS. 4 and 5 show an embodiment wherein the input power to the electromagnetic clutch 12 is controlled. In this embodiment the input voltage to the electromagnetic clutch 12 is maintained lower than the nominal voltage during the initial drive state of the scanning means to reduce the transmitted torque, thereby said scanning means is started with a smaller acceleration to realize a smoother start. The clutch 12 receives an entire nominal supply voltage after the start of drive and before the start of scanning exposure of the leading end of original. The electromagnetic clutch 12 to be employed in this embodiment is preferably of a type in which the output torque is approximately proportional to the input voltage. Also a further improved start can be realized by employing the above-explained braking function in combination with the control of power supplied to the clutch.

In the following there will be explained the examples of circuits adapted for use in the present embodiment.

Figure 6:
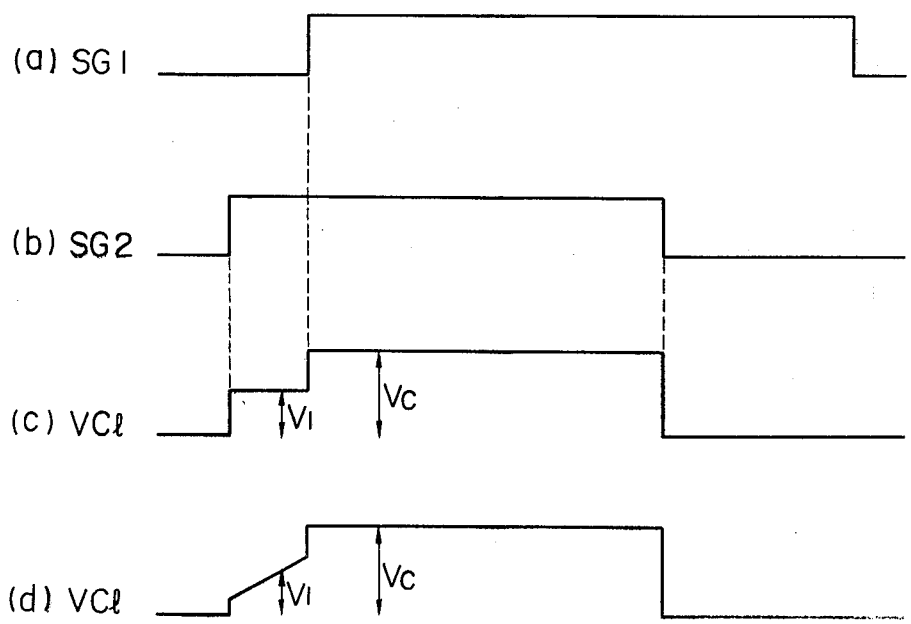
FIG. 6 is a time chart explaining the functions of the circuits shown in FIGS. 4 and 5.

FIG. 4 shows a circuit for supplying the electromagnetic clutch with a stepwise increased voltage for buffered start of the optical system, while FIG. 5 shows another circuit for providing a linearly increasing voltage for the same purpose. The output voltages of these circuits are shown in FIG. 6.

In FIG. 4 there are shown transistors Tr1–Tr5, resistors R1–R3, diodes D1–D3, an electromagnetic clutch C11, and drive control signal inputs SG1–SG2 for the clutch C11. When a control signal SG2 represented by FIG. 6(b) is supplied to the base of transistor Tr5, said transistor Tr5 is rendered conductive to supply base current to the transistors Tr2 and Tr3 through the resistor R2, whereby an amplified current obtained from the emitter of said transistor Tr2 flows through the diode D1, clutch C11, diode D2 and transistor Tr5. Also a current is generated in the resistor R3 through the resistor R2. The base voltage of transistor Tr3 is approximately equal to the power supply voltage Vc divided by the resistors R2 and R3. (Vc. R3/(R2+R3)), and the clutch C11 receives a voltage V1 equal to the above-mentioned voltage minus the voltage drop between the base and emitter of transistors Tr2 and Tr3 and the voltage drop in the diodes D1 and D2. Consequently the clutch C11 generates a torque transmission for driving the optical system, but said voltage which is reduced as explained in the foregoing provides a state of slip connection achieving a gradual acceleration of the scanning system, thereby suppressing the vibration of said system.

When the optical system is accelerated in this manner to an approximately nominal speed, there is generated a control signal SG1, as shown in FIG. 6(b), which renders the transistor Tr4 conductive supplying a current to the base thereof. Thus a current is supplied to the base of transistor Tr1 through the resistor R1 and transistor Tr4 to render said transistor Tr1 conductive, whereby the clutch C11 receives a voltage equal to the power supply voltage minus the voltage drops in Tr1, Tr5 and D2. As said voltage drops are sufficiently small, the clutch C11, receiving a voltage substantially equal to the entire power supply voltage Vc as shown in FIG. 6(c), generates a maximum torque transmission to drive the scanning system at a stable speed.

The above-mentioned control signal SG1 is supplied when the scanning system is in the course of pre-exposure run prior to the scanning exposure of the original and has reached an almost constant speed.

Said signal SG1 is obtainable by means of a switch which is closed when the optical system is located at a predetermined position before start thereof and opened when it reaches a predetermined position after the start thereof (a position for acquiring an almost constant speed). Said switch can be composed for example of a combination of a cam provided on the optical system 4 shown in FIG. 1 and a microswitch provided corresponding to the above-mentioned positions, or a combination of a magnet provided on said optical system 4 and a hall element provided corresponding to the above-mentioned position. The functioning timing of said switch is shown in FIG. 7.

Also said signal SG2 is obtainable from a signal system synchronized with the actuation of a copy start button instructing the start of exposure, for example from a combination of a known cam provided on the drum and a cam switch releasing a signal at a certain angular position of the photosensitive drum 8 corresponding to the exposure start position. The functioning timing of said switch is also shown in FIG. 7. Also the signal SG1 is obtainable from a drum cam releasing a signal after a certain delay from the release of signal SG2.

Furthermore the signals SG1 and SG2 are also obtainable by replacing said drum cams with a so-called clock disc synchronized with the drum rotation and by counting the optical pulses obtained by the rotation of said disc.

Now referring to FIG. 7, upon actuation of a copy start button there are initiated the functions of chargers 112, 113 and 127 and of lamp 133 and the rotation of drum 130 to perform cleaning and charge elimination of the surface thereof. Upon passing of the drum through a drum stop position after a full rotation thereof, a switch DHP (FIG. 1) is actuated to light the lamp 109 and to initiate the function of the developing station 131. Thereafter released is the signal SG2 which is delayed, by means of a timer, by the induction period of said lamp 109. Thus the optical system initiates the forward displacement, and, upon passing through a stop position therefor, a switch OHP releases the signal SG1. Thereafter there is initiated the exposure of the leading end of an image with a slight delay which corresponds to the difference in position of said switch OHP and of the leading end of the image and is provided for assuring the image quality of the leading end of the image. Then upon arrival of the optical system at an exposure end position, an unrepresented switch BP cooperating with the cam of the optical system terminates the signal SG2, whereby the optical system performs the reversing displacement by the spring, and, upon arrival thereof at a stop position, the switch DHP is actuated to terminate the signal SG1. The above-mentioned procedure is repeated a plurality of times corresponding to the number of desired copies as the drum again actuates the switch DHP to initiate the function of lamp 109 etc. The paper feed roller 124 is controlled by a switch PF (FIG. 1) actuated by the drum cam, while the register roller 125 is driven by the drum gear through a clutch which is energized by a switch actuated by a cam provided in the path of forward displacement of the optical system, whereby the transfer sheet is advanced in register with the leading end of image. It is also possible to prevent eventual shock at the start of said roller and apparatus by controlling the voltage to be supplied to said clutch in the above-explained manner.

The reversing displacement of the optical system can also be achieved by the force of said drum gear, instead of the spring force. In such case the shaft 11 is further provided with a clutch for reverse rotation of pulley 5, said clutch being connected after the aforementioned clutch is disconnected. Also in this case it is possible to alleviate the shock and vibration in the optical system and in the entire apparatus at the start of said reversing displacement by controlling the voltage supplied to the clutch in the above-explained manner at said start. In this manner it is possible to reduce the unpleasant noise and shock in the copying apparatus.

Figure 8:
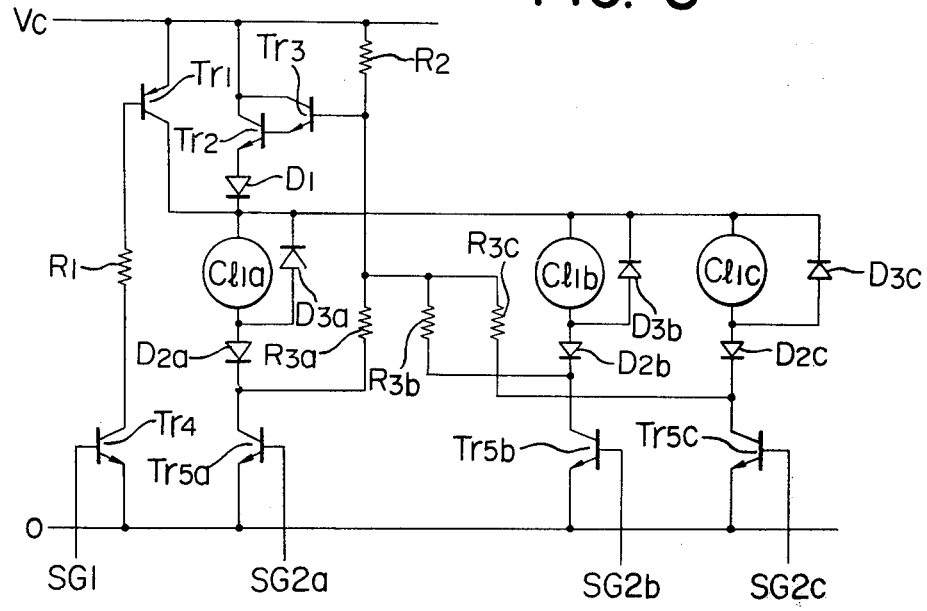
FIG. 8 is a diagram of a scanning control circuit for use in copying with a variable magnification.

FIG. 8 shows an embodiment adapted for preventing vibration in a copier wherein the scanning speed of the optical system is variable in three stages, for reduction copying of the original. In FIG. 8 CL1a CL1c are clutches provided on three gears of different gear ratios meshing with the drum gear 9, said clutches being selectively energized to drive the pulley 5 through either one of said gears, thereby changing the scanning speed. The signals SG2a-SG2c for energizing said clutches CL1a-CL1c are obtained from a magnification designating signal from the control panel of the copier and the signal from aforementioned switch DHP. Thus a clutch for a faster scanning speed is selected for a higher reduction ratio. The signal SG1 is same as the aforementioned signal supplied from said switch DHP. Also the zoom ratio of the lens system 117 is correspondingly selected to form, by scanning exposure, an image of a selected reduction ratio on the drum. In this embodiment the prevention of vibration is achieved by creating a slip connection state in said clutches CL1a-CL1c, and a very quiet starting is realizable by suitably selecting the initial voltage V1 for the clutches for faster scanning speeds. In practice an initial voltage equal to ½ to ⅓ of the nominal voltage is found to be suitable for the clutch for a same-size copying while a lower initial voltage is preferable for a faster scanning speed. Said voltage V1 is adjustable by modifying the resistors R3a-R3c.

FIG. 5 shows an another embodiment adapted for providing the clutch with a voltage which linearly increases in the beginning and thereafter reaches a full voltage as shown in FIG. 6(d). In FIG. 5 there are shown transistors Tr1-Tr5, resistors R1-R6, diodes D1-D3, a condenser C1, and control signals SG1 and SG2 for a clutch CL1.

When the transistor Tr5 is rendered conductive by the control signal SG1, there is formed a current through R2 and D5 to reduce the potential at the junction point between R2, D5 and R3, whereby the base potential of transistor Tr6 connected to the junction point between R3 and R4 to render said transistor non-conductive, thus giving a charging current to the condenser C1 through the resistors R5 and R6. Therefore the base potential of the transistor Tr3 is equal to the power supply voltage Vc divided by the resistors R5 and R6 directly after the transistor Tr6 is rendered non-conductive, and thereafter is equal to a gradually increasing voltage V1 as the voltage of condenser C1 increases. Consequently the clutch CL1 receives said voltage V1 minus the voltage drop between the base and emitter of transistors Tr2 and Tr3, the voltage drop between the collector and emitter of Tr5 and the voltage drop across the diode D1, said voltage being approximately equal to the base potential of transistor Tr3 as said voltage drops are relatively small. In this manner the clutch CL1 receives a reduced voltage to generate a torque transmission for gradually accelerating the scanning optical system.

When the optical system reaches a constant speed, the transistors Tr4 and Tr5 are rendered conductive by the control signal SG1 thereby applying a full supply voltage to the clutch CL1 which thus generates the maximum torque transmission for stably driving the optical system.

Figure 9:
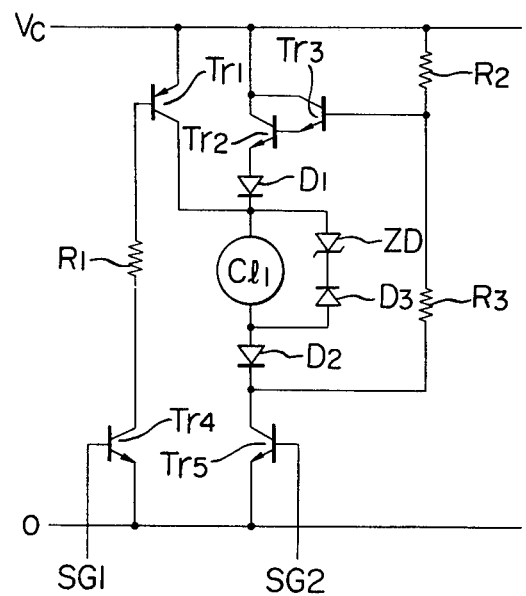
FIG. 9 is a diagram showing an improvement on the circuit shown in FIG. 4.

FIG. 9 shows an embodiment of the circuit for preventing deteriorated cut-off response resulting from the current induced when the clutch CL1 is cut-off. D4 is a diode connected in parallel to the clutch CL1, and ZD is a Zenar diode connected in series with the diode D4.

When the transistor Tr5 is rendered non-conductive to terminate the voltage supply to the clutch, the inductance thereof generates an inverse potential which results in a noise current and eventually in the destruction of transistor Q etc. The diode D4 is provided to bypass such current thereby avoiding the above-mentioned drawback. In such case, however, as the current remains in the clutch for a while even after the power supply thereto is terminated, the clutch is not immediately cutt off so that the optical system is not immediately stopped but may collide with the end of path therefor causing a shock thereto. Such trouble becomes marked when the speed thereof is faster. According to the present embodiment, however, an immediate stop of the optical system is realized as such induced current is consumed in the Zenar diode. Said Zenar diode may also be replaced by a resistor.

Although in the foregoing embodiments the optical scanning system is driven through a clutch, it will be readily understood that, in case of achieving forward and reversing displacement of the optical system by means of an exclusive forward-reverse rotation motor, the vibration and shock can be prevented by controlling, in the foregoing manner, the driving force of motor at the start of forward and reverse rotation. Furthermore, in color copiers, electromagnetic clutches are employed for example in case of selecting filters by rotating a rotary member provided with plural color separating filters, of selecting developing devices holding different color toners by means of a motor, or of inversely rotating the developing roller for cutting the ends of a developer brush. Also in these cases the aforementioned control is applicable for preventing the shock and vibration.

What we claim is:

1. A scanning exposure apparatus comprising:
   a scanning exposure means;
   means for causing forward and reverse displacement of said scanning exposure means;
   means for driving said displacing means at a predetermined speed in one direction; and
   means for controlling the drive force of said driving means such that said displacing means is driven with a low acceleration at the initial stage of driving by providing said driving means with a voltage at the initial stage of driving which is lower than the rated voltage provided during exposure 2. A scanning exposure apparatus comprising:
   a scanning exposure means;
   means for causing forward and reverse displacement of said scanning exposure means;
   means maintained in constant rotation; and
   means for controlling the drive force of said displacing means by driving said displacing means with low acceleration at the initial stage of driving, said control means including an electromagnetic clutch connecting said displacing means with said rotating means for driving said displacing means, wherein said control means is adapted to provide said clutch with voltage at the initial stage of the driving of said displacing means which is lower than the voltage provided during exposure;
   whereby an initial slip connection and low acceleration of said displacing means may be achieved.

3. A scanning exposure apparatus according to claim 2 wherein said rotating means is a rotary photosensitive member to be exposed by said scanning exposure means, and wherein said displacing means includes a wire for driving said scanning means and a pulley for driving said wire, said clutch connecting said photosensitive member and said pulley.

4. A scanning exposure apparatus according to claim 2, wherein said control means is adapted to maintain said clutch in a normal connecting state for driving said driving means at a stable speed after the slip connecting state thereof has been maintained for a predetermined period.

5. A scanning exposure apparatus according to claim 2 wherein the circuit of said clutch is provided with an element for consuming the current induced when power supply to said clutch is terminated.

6. A scanning exposure apparatus according to claim 2 further comprising means for initiating an exposure after a stable speed has been achieved.

7. A scanning exposure apparatus according to claim 2, wherein said control means begins to operate only after an exposure lamp has been turned on.

8. A scanning exposure apparatus according to claim 2, wherein said control means includes a first clutch for the forward displacement of said displacing means and a second clutch for the return displacement thereof, said first and second clutches being supplied with a voltage lower than the rated voltage at the initial stages of forward and return displacement.

9. A scanning exposure apparatus according to claim 2, wherein said control means gradually increases the voltage supplied to said clutch during the initial stage of driving and, at a predetermined time, rapidly increasing the voltage to a predetermined value.

10. A scanning exposure apparatus according to claim 2,
    wherein said control means comprises braking means operative against the driving force of said displacing means, said braking means being actuated at least in the initial stage of the driving of said displacing means and for a predetermined period, and wherein said control means disengages said brake means after exposure.

11. A scanning exposure apparatus according to claim 2, further comprising a rotatable photosensitive member adapted to be exposed to light by said scanning exposure means,
    wherein said displacing means comprises a wire for driving said scanning means and a pulley for driving said wire, and wherein said control means further comprises braking means for opposing the drive force of said pulley which rotates in synchronism with said rotatable photosensitive member, said braking means being actuated at least during the initial stage of driving said displacing means.

12. A scanning exposure apparatus comprising:
    a scanning exposure means;
    means for causing forward and reverse displacement of said scanning exposure means;
    means maintained in constant rotation; and
    means for controlling the drive force of said displacing means by driving said displacing means with low acceleration at the initial stage of driving, said control means including a plurality of alternatively operable electromagnetic clutches for connecting said displacing means with said rotating means, wherein said control means is adapted to provide a voltage at the initial stage of driving which is lower than that provided during exposure, said voltage being applied to one of the different clutches according to the desired magnification of the exposure;

whereby an initial slip connection and low acceleration of said displacing means may be achieved.

13. An image forming apparatus according to claim 12 wherein said voltage providing means is adapted to provide a voltage for the normal operation after the above-mentioned lower voltage has been supplied for a predetermined period.

14. An image forming apparatus according to claim 12 wherein the circuit of said clutch is provided with an element for consuming the current induced when the power supply to said clutch is terminated.

15. An image forming apparatus according to claim 12 wherein said rotary member is a means for rotating a photosensitive member for forming a transferred image on said recording member.

16. A scanning exposure apparatus comprising:
a scanning exposure means,
means for causing forward and reverse displacement of said scanning exposure means;
means maintained in constant rotation; and
means for controlling the drive force of said displacing means by driving said displacing means with low acceleration at the initial stage of driving, said control means including an electromagnetic clutch for connecting said displacing means with said rotating means for driving said displacing means and braking means operable against the drive force of said displacing means, said braking means being actuated at least during the initial stage of driving, wherein said control means is adapted to provide said clutch with a voltage at the initial stage of driving which is lower than the voltage during exposure;
whereby a slip connection and low acceleration of said displacing means may be achieved.

17. A scanning exposure apparatus according to claim 16, wherein during exposure said clutch is provided with the rated voltage and said brake means remains actuated.

18. A scanning exposure apparatus comprising:
a scanning exposure means;
means for causing forward and reverse displacement of said scanning exposure means; and
means for controlling the driving force of said displacing means by driving said displacing means with low acceleration at the initial stage of driving, wherein said control means comprises braking means operative against the driving force of said displacing means, said braking means being actuated at least in the initial stage of the driving of said displacing means and for a predetermined period, and wherein said control means disengaged said brake means after exposure.

19. A scanning exposure apparatus comprising:
a scanning exposure means;
a rotatable photosensitive member adapted to be exposed to light by said scanning exposure means;
means for causing forward and reverse displacement of said scanning exposure means, including means for connecting said displacing means with said rotatable photosensitive member for driving said displacing means; and
means for controlling the driving force of said displacing means by driving said displacing means with low acceleration at the initial stage of driving, wherein said control means comprises braking means operative against the driving force of said displacing means, said braking means being actuated at least in the initial stage of the driving of said displacing means and for a predetermined period, and wherein said control means further includes a clutch for actuating said brake, said clutch being disengaged after exposure.

* * * * *

UNITED STATES PATENT AND TRADEMARK OFFICE
CERTIFICATE OF CORRECTION

PATENT NO. : 4,243,311
DATED : January 6, 1981
INVENTOR(S) : YOSHIKUNI TOHYAMA, ET AL.

It is certified that error appears in the above-identified patent and that said Letters Patent are hereby corrected as shown below:

Column 7, line 10, "cutt off" should be --cut-off--.

Claim 13, line 2, at Column 9, line 6, change "12" to --20--.

Claim 14, line 2, at Column 9, line 11, change "12" to --20--.

Claim 15, line 2, at Column 9, line 16, change "12" to --20--.

Column 10, line 39, insert the following claim:

20. An image forming apparatus comprising:

operating means for performing a timed function for forming an image on a recording member;

a rotary member maintained in rotation at a predetermined speed;

an electromagnetic clutch for connecting said operating means with said rotary member at determined times for achieving timed drive of said operating means; and

UNITED STATES PATENT AND TRADEMARK OFFICE
CERTIFICATE OF CORRECTION

PATENT NO. : 4,243,311
DATED : January 6, 1981
INVENTOR(S) : YOSHIKUNI TOHYAMA, ET AL.

It is certified that error appears in the above-identified patent and that said Letters Patent are hereby corrected as shown below:

```
a means for providing said clutch with a voltage at
   the initial state of operation of said operating
   means which is lower than the voltage provided during
   the normal operating state thereof.
```

On the cover sheet, "19" Claims" should read --20 Claims--

Signed and Sealed this

Twenty-first Day of July 1981

[SEAL]

*Attest:*

*Attesting Officer*

GERALD J. MOSSINGHOFF

*Commissioner of Patents and Trademarks*